United States Patent [19]

Najjar

[11] Patent Number: 4,851,152
[45] Date of Patent: Jul. 25, 1989

[54] PREVENTION OF FORMATION OF NICKEL SUBSULFIDE IN PARTIAL OXIDATION OF HEAVY LIQUID AND/OR SOLID FUELS

[75] Inventor: Mitri S. Najjar, Hopewell Junction, N.Y.

[73] Assignee: Texaco Inc., White Plains, N.Y.

[21] Appl. No.: 242,588

[22] Filed: Sep. 12, 1988

Related U.S. Application Data

[63] Continuation-in-part of Ser. No. 32,157, Mar. 27, 1987, Pat. No. 4,774,021.

[51] Int. Cl.$^4$ ............................ C01B 3/22; C01B 3/24
[52] U.S. Cl. ................................. 252/373; 48/197 R
[58] Field of Search ..................... 252/373; 48/197 R

[56] References Cited
U.S. PATENT DOCUMENTS 4,654,164 3/1987 Najjar .
4,732,700 3/1988 Najjar et al. ...................... 252/373
4,774,021 9/1988 Najjar et al. ...................... 252/373

Primary Examiner—Howard T. Mars
Attorney, Agent, or Firm—Robert A. Kulason; James J. O'Loughlin; Albert Brent

[57] ABSTRACT

A sulfur-containing heavy liquid hydrocarbonaceous fuel and/or solid carbonaceous fuel with nickel, vanadium, and silicon containing ashes is mixed with a copper and/or cobalt-containing material to provide a weight ratio of copper and/or cobalt to nickel in the range of about 0.2 to 10; and the weight ratio of copper and/or cobalt to silicon in said mixture is in the range of about 0.0001 to 0.04. The mixture is reacted by partial oxidation in a down-flowing free-flow unobstructed vertical reaction zone with refractory lined walls at a temperature in the range of about 1800° F. to 2900° F., an equilibrium oxygen concentration in the gas phase in the reaction zone with a partial pressure in the range of about $1.7 \times 10^{-15}$ to $2.3 \times 10^{-8}$ atmospheres; and an equilibrium sulfur concentration in the gas phase in the reaction zone with a partial pressure in the range of about $2.53 \times 10^{-7}$ to $8.1 \times 10^{-2}$ atmospheres. A raw effluent gas stream is produced comprising $H_2 + CO$ and containing entrained slag comprising the following phases: (i) Cu-Ni or Co-Ni alloy, (ii) copper silicate and/or cobalt silicate, (iii) a spinel phase, and (iv) about 0 to 5 wt. % of a fluid oxysulfide phase. Substantially no toxic $Ni_3S_2$ is produced in the slag.

25 Claims, No Drawings

PREVENTION OF FORMATION OF NICKEL SUBSULFIDE IN PARTIAL OXIDATION OF HEAVY LIQUID AND/OR SOLID FUELS

This is a continuation-in-part of coassigned application Ser. No. 07/032,157, filed Mar. 27, 1987 now U.S. Pat. No. 4,774,021.

FIELD OF THE INVENTION

This invention relates to a process for the partial oxidation of a sulfur-containing heavy liquid hydrocarbonaceous or solid carbonaceous fuel having a nickel, vanadium, and silicon-containing ash to produce gaseous mixtures comprising $H_2+CO$ and entrained molten slag. More particularly, it pertains to an additive system for preventing the formation of toxic $Ni_3S_2$ in said molten slag.

The partial oxidation of liquid hydrocarbonaceous fuels such as petroleum products and slurries of solid carbonaceous fuels such as coal and petroleum coke are well known processes. The foreseeable trend of petroleum reserves is that the produced crude will be increasingly heavier and of poorer quality. To compensate for this trend, refiners must employ more "bottom of the barrel" upgrading to provide the desired light products. The current industry workhouse to provide this upgrading is some type of coking operation (either delayed or fluid). A good deal of current refinery expansion includes the installation or expansion of coker units, an this, coking will be a process of general use for some time to come.

A major drawback for coking is the disposal of the product coke. With a reasonably clean coker feed, the product coke has been substituted for applications requiring relatively pure carbon, such as for electrode manufacture. With the feed crudes becoming poorer, there are compounding factors affecting coker operations. Since the crudes contain more contaminants, i.e. sulfur, metals (predominately vanadium, nickel, and iron), and ash which are concentrated in the product coke, petroleum coke made from such crude stock is of a much poorer quality and is excluded from many normal product applications. For example, the presence of toxic $Ni_3S_2$ in the coke ash severely limits its use. Further, because the crudes are heavier, i.e, contain more coke precursors, more of this poorer quality coke is produced from each barrel of ash-containing heavy liquid hydrocarbonaceous fuel. The manufacture of petroleum coke pellets by a delayed coking process is described in coassigned U.S. Pat. No. 2,709,676.

The Texaco partial oxidation gasification process offers an alternative processing route for use of the coke or the ash-containing heavy liquid hydrocarbonaceous fuel. For example, water slurries of petroleum coke are reacted by partial oxidation in coassigned U.S. Pat. No. 3,607,157. Gasification is often cited as a convenient means of coke disposition. The decision to use gasification as a coke disposal means is generally based on economics. The expected rise in energy costs and legislation requiring total use of feed crude should shortly bring about a greater utilization of petroleum coke feeds to the partial oxidation gas generator.

Previous gasification runs with delayed coke and heavy liquid hydrocarbonaceous fuel gave rise to some unexpected operating problems. For example, a very fine intergrowth of toxic nickel subsulfide ($Ni_3S_2$) was found in slag produced by the partial oxidation of sulfur-containing heavy liquid hydrocarbonaceous fuels and/or petroleum coke with said fuels having a nickel, vanadium and silicon-containing ash. Further, the ash which normally melts and is discharged from the gasifier as a slag, was not melting completely and being discharged. Instead, it was building up on the walls of the refractory. Nickel impurities may under certain condition form troublesome nickel carbonyl deposits downstream in the system. In coassigned U.S. Pat. No. 4,671,804, large amounts of iron-containing additives were used and problems with nickel subsulfide were avoided. However, the amount of slag produced and slag disposal costs were increased. Further, iron oxide may contribute to the formation of increased amounts of silicate crystals that can have deleterious affects on the slag properties. In coassigned U.S. Pat. No. 4,654,164, all of the sulfur forms a copper oxysulfide washing agent that collects and transports at least a portion of the vanadium and other ash components out of the reaction zone. In coassigned U.S. Pat. No. 4,732,700, a slag separation chamber was provided after the gasifier for collecting on its walls a portion of the slag entrained in the process gas stream. The fuel was fed to the gasifier in admixture with an upgraded recycle portion of slag and a copper-containing additive. The aforesaid process, and the fluxing as used in coal operations and in U.S. Pat. Nos. 1,799,885 and 2,644,745 do not provide a solution to applicant's problems involving troublesome nickel and sulfur.

It was unexpectedly found that by the addition of small amounts of copper and/or cobalt-containing materials with the fuel feed, as provided by the subject invention, the equilibrium is shifted away from the $Ni_3S_2$ field. This is an improvement in the art since it permits operation of the partial oxidation gas generator without the production of ash containing toxic nickel subsulfide.

SUMMARY OF THE INVENTION

This is a process for the production of gaseous mixtures comprising $H_2+CO$ by the partial oxidation of a fuel feedstock comprising a heavy liquid hydrocarbonaceous fuel containing sulfur and having an ash comprising nickel, vanadium and silicon and/or a solid carbonaceous fuel containing sulfur and having an ash comprising nickel, vanadium and silicon. Further, said feedstock includes a minimum of about 0.2 wt. % of sulfur, such as about 1.5 to 6.5 wt. %; and said feedstock includes a minimum of about 0.5 ppm (parts per million) of nickel, such as about 2.0 to 4,000 ppm; a minimum of about 1.0 ppm of vanadium, such as about 20 to 5,000 ppm; and a minimum of about 5.0 ppm of silicon, such as about 5.0 to 20,000 ppm, or more. An additive system is provided which prevents the formation of toxic nickel subsulfide ($Ni_3S_2$) in slags generated during the partial oxidation of said feedstocks without raising the activity and pressure of sulfur-bearing gases e.g. $H_2S$ and COS. The cost of a downstream gas purification system is thereby minimized. The process includes the steps of (1) mixing together a copper and/or cobalt-containing material with said fuel feedstock; wherein the weight ratio of copper and/or cobalt to nickel in said mixture is in the range of about 0.2 to 10; and the weight ratio of copper and/or cobalt to silicon in said mixture is in the range of about 0.0001 to 0.04; (2) reacting said mixture from (1) by partial oxidation with a free-oxygen containing gas in a reducing atmosphere and in the presence of a temperature moderator at a pressure in the range of about 2 to 250 atmospheres in a down-flowing free-flow unobstructed vertical reaction zone with refractory lined walls in a partial oxidation gas generator, and at a temperature in the range of about 1800° F. to 2900° F.; an equilibrium oxygen concentration is provided in the gas phase in the reaction zone with a partial pressure in the range of about $1.7 \times 10^{31\ 15}$ to $2.3 \times 10^{-8}$ atmospheres; an equilibrium sulfur concentration is provided in the gas phase in the reaction zone with a partial pressure in the range of about $2.53 \times 10^{-7}$ to $8.1 \times 10^{-2}$ atmospheres; the free O/C atomic ratio is in the range of about 0.3 to 1.2; the $H_2O$ liquid hydrocarbonaceous fuel and/or solid carbonaceous fuel weight ratio is in the range of about 0.1 to 5.0; thereby producing a hot raw effluent gas stream in said reaction zone comprising $H_2+CO$ and entrained molten slag; and converting about 90 to 99.9 wt. % of the carbon in said fuel feedstock into carbon oxides; and where in said reaction zone said copper and/or cobalt-containing material combines with at least a portion of said nickel, sulfur, and silicon constituents in the fuel feedstock in said reaction zone to produce said slag with at least a portion e.g. about 10.0 to 98.0 wt. % depositing on the inside walls of said reaction zone and comprising the following phases in wt. %: (i) about 0.1 to 10 wt. % of a Cu-Ni alloy phase and/or Co-Ni alloy phase, wherein the weight ratio of Cu and/or Co to Ni is in the range of about 0.2 to 0.9; (ii) from about 5.0 to 85 wt. % of a copper silicate and/or cobalt silicate phase in which the Cu and/or Co is present in the range of about 0.01 to 2.0 wt. %; (iii) from about 2.5 to 45 wt. % of a spinel phase in which the following are present in wt. %: V 5-60, Fe 7-65, Al 0.1-40, Mg 0.1-35, Cr 0.01-42, and others 0.1-10; and (iv) the remainder of the slag comprises a fluid oxysulfide phase comprising the sulfides of Cu and/or Co, and Fe; and wherein said slag contains substantially no less than about 0.001 wt. % $Ni_3S_2$ and there is a reduction of about 1 to 20 wt. % in the mole ratio $H_2S+COS/H_2+CO$ in the raw effluent gas stream over said mole ratio when said partial oxidation reaction takes place in the absence of said Cu and/or Co-containing materials; and, (3) separating non-gaseous material containing substantially no $Ni_3S_2$ from said hot raw effluent gas stream.

In one embodiment, after from about 1–180 days of operation, the gas generator is shut down. The reducing atmosphere in the reaction zone is changed to oxidizing. The slag on the walls of the reaction zone is oxidized so that the fusion temperature and viscosity are reduced. The molten slag, substantially free from $Ni_2S_3$, flows by gravity down to the bottom of the gas generator.

In another embodiment, a mixture of sulfur-containing heavy liquid hydrocarbonaceous fuel with a nickel, vanadium and silicon-containing ash, and said copper and/or cobalt-containing material is fed to a coker to produce a sulfur-containing petroleum coke with a nickel, vanadium, and silicon-containing ash. The copper and/or cobalt-containing material is uniformly dispersed throughout said petroleum coke. This petroleum coke is then reacted in the partial oxidation gas generator to produce synthesis gas, reducing gas, or fuel gas. This process comprises the following:

A process for the production of gaseous mixtures comprising $H_2+CO$ by the partial oxidation of a fuel feedstock comprising sulfur-containing petroleum coke having an ash comprising nickel, vanadium and silicon; and said feedstock includes a minimum of about 0.5 ppm nickel, a minimum of about 0.2 wt. % of sulfur, a minimum of about 1.0 ppm of vanadium, and a minimum of about 5.0 ppm of silicon; said process comprising:

(1) mixing together a copper and/or cobalt-containing material with a sulfur-containing heavy liquid hydrocarbonaceous fuel having a nickel, vanadium and silicon containing ash; wherein the weight ratio of copper and/or cobalt to nickel in said mixture is in the range of about 0.2 to 10; and the weight ratio of copper and/or cobalt to silicon in said mixture is in the range of about 0.0001 to 0.04;

(2) coking said mixture from step (1) to produce sulfur-containing petroleum coke having a nickel, vanadium, and silicon-containing ash and having dispersed therein said copper and/or cobalt-containing material;

(3) introducing the petroleum coke from step (2) into a free-flow refractory lined partial oxidation reaction zone as a pumpable slurry of petroleum coke in water, liquid hydrocarbonaceous fluid or mixtures thereof, or as substantially dry petroleum coke entrained in a gaseous transport medium;

(4) reacting said slurry of petroleum coke from step (3) by partial oxidation with a free-oxygen containing gas in a reducing atmosphere and in the presence of a temperature moderator at a pressure in the range of about 2 to 250 atmospheres in a down-flowing free-flow unobstructed vertical reaction zone with refractory lined walls of a partial oxidation gas generator and at a temperature in the range of about 1800° F. to 2900° F., and an equilibrium oxygen concentration is provided in the gas phase in the reaction zone with a partial pressure in the range of about $1.7 \times 10^{-15}$ to $2.3 \times 10^{-8}$ atmospheres; an equilibrium sulfur concentration is provided in the gas phase in the reaction zone with a partial pressure in the range of about $2.53 \times 10^{-7}$ to $8.1 \times 10^{-2}$ atmospheres, the free O/C atomic ratio is in the range of about 0.3 to 1.2, the $H_2O$/liquid hydrocarbonaceous fuel and/or solid carbonaceous fuel weight ratio is in the range of about 0.1 to 5.0; thereby producing a hot raw effluent gas stream comprising $H_2+CO$ and entrained slag; and converting about 90 to 99.9 wt. % of the carbon in said fuel feedstock into carbon oxides; and where in said reaction zone said copper and/or cobalt-containing material combines with at least a portion of said nickel, sulfur, and silicon constituents in the fuel feedstock to produce said slag with at least a portion depositing on the inside walls of said reaction zone and comprising the following phases in wt. %: (i) about 0.1 to 10 wt. % of a Cu-Ni alloy phase and/or Co-Ni alloy phase, wherein the weight ratio of Cu and/or Co to Ni is in the range of about 0.2 to 0.9; (ii) from about 5.0 to 85 wt. % of a copper silicate and/or cobalt silicate phase in which Cu and/or Co is present in the range of about 0.01 to 2.0 wt. %; (iii) from about 2.5 to 45 wt. % of a spinel phase in which the following are present in wt. %: V 5-60, Fe 7-65, Al 0.1-40, Mg 0.1-35, Cr 0.01-42, and others 0.1-10; and (iv) the remainder of the slag comprises a fluid oxysulfide phase comprising the sulfides of Cu and/or Co, and Fe; and wherein said slag contains substantially no $Ni_3S_2$ and there is a reduction in the mole ratio $H_2S+COS/H_2+CO$ in the raw effluent gas stream over said mole ratio when said partial oxidation reaction takes place in the absence of said Cu and/or Co-containing materials; and (5) separating non-gaseous materials containing substantially no $Ni_3S_2$ from said hot raw effluent gas stream.

DISCLOSURE OF THE INVENTION

Processes for the partial oxidation of heavy liquid hydrocarbonaceous fuel and petroleum coke are described respectively in coassigned U.S. Pat. Nos. 4,411,670 and 3,607,156, which are incorporated herein by reference. Further, suitable free-flow refractory lined gas generators and burners that may be used in the production of synthesis gas, reducing gas, or fuel gas from these materials are also described in the aforesaid references. Advantageously, the subject process uses relatively inexpensive fuel feedstocks comprising sulfur-containing heavy liquid hydrocarbonaceous fuel and/or petroleum coke feedstocks with said materials having a nickel, vanadium, and silicon-containing ash. The expression "and/or" as used herein means either one or both of the items or materials specified. Further, these feedstocks include a minimum of about 0.2 wt. % of sulfur, such as in the range of about 0.2 to 6.5 wt. %; a minimum of about 0.5 ppm of nickel, such as in the range of about 2.0 to 4000 ppm; a minimum of about 1.0 ppm vanadium, such as in the range of about 20 to 5,000 ppm; a minimum of about 5.0 ppm of silicon, such as in the range of about 5.0 to 20,000 ppm, or more.

By definition, the term sulfur-containing heavy liquid hydrocarbonaceous material or fuel having a nickel, vanadium, and silicon-containing ash is a petroleum or coal derived fuel selected from the group consisting of virgin crude, residue from petroleum distillation and cracking, petroleum distillate, reduced crude, whole crude, asphalt, coal oil, coal derived oil, shale oil, tar sand oil, and mixtures thereof.

By definition, the term sulfur-containing petroleum coke having a nickel, vanadium, and silicon-containing ash is petroleum coke made from sulfur-containing heavy liquid hydrocarbonaceous fuel having a nickel, vanadium, and silicon-containing ash by conventional coke methods such as by the delayed or fluid coking process, such as described in coassigned U.S Pat. No. 3,673,080, which is incorporated herein by reference.

Closer study of the ashes derived from the partial oxidation, without an additive, of a feedstock comprising sulfur-containing heavy liquid hydrocarbonaceous fuels and/or solid carbonaceous fuel having nickel, vanadium, and silicon-containing ashes shows that they are largely composed of oxide and sulfide compounds of nickel, vanadium, and silicon along with some normally occurring mineral matter species. The total ash content of heavy liquid hydrocarbonaceous fuel or petroleum coke may be only about one-half to 5 weight percent (wt. %), whereas coal typically contains 10–20 wt. % ash.

It is theorized that in the heavy liquid hydrocarbonaceous material and petroleum coke systems, a good deal of the ash material is liberated as individual molecular species. This is because upon vacuum distillation or coking, the metallic species in the crude, which are generally presented as porphyrin type structures (metal atoms, oxides or ions thereof confined in an organic frame-work), are entrapped within the collapsed carbon matrix.

This invention provides an improved copper and/or cobalt-containing additive system to prevent the formation of toxic nickel subsulfide ($Ni_3S_2$) in slags generated during the partial oxidation of sulfur, nickel, vanadium, and silicon-containing heavy liquid hydrocarbonaceous and/or petroleum coke feedstocks. Without the subject invention, there may be about 0.1 to 5.0 wt. % of troublesome toxic nickel subsulfide in the slag. Another advantage of the subject invention is the reduction in the activity, pressure, and concentration of sulfur-bearing gases e.g. $H_2S$ and COS. For example, the concentration of $H_2S$ +COS in the raw product gas stream from the partial oxidation gas generator may be reduced in the range of about 1 to 20 %, such as about 5 to 10%, by the subject invention, in comparison with the concentration of $H_2S$ +COS in the raw product gas stream as produced without the copper and/or cobalt-containing material. The cost of downstream gas purification is thereby minimized. Further, a means of introducing the copper and/or cobalt-containing material into the system to give maximum effectiveness is provided.

The copper and/or cobalt-containing material comprises compounds of copper and/or cobalt, and preferably the oxides of copper and/or cobalt. Sufficient copper and/or cobalt-containing material is introduced to provide a wt. ratio of copper and/or cobalt to nickel in the range of about 0.2 to 10, such as about 1 to 3, and the weight ratio of copper and/or cobalt to silicon in said mixture is in the range of about 0.0001 to 0.04, such as about 0.005 to 0.02. This ratio may be also expressed as 0.02 parts by wt. of copper and/or cobalt per part by wt. of nickel in the fuel feedstock.

The partial oxidation reaction takes place at a pressure in the range of about 2 to 250 atmospheres, such as about 15 to 200 atmospheres, in a down-flowing free-flow unobstructed vertical reaction zone with refractory lined walls. The fuel feed is reacted by partial oxidation with a free-oxygen containing gas in a reducing atmosphere and in the presence of a temperature moderator. The temperature in the reaction zone is in the range of about 1800° F. to 2900° F., such as about 2250° F. to 2500° F. An equilibrium oxygen concentration is provided in the gas phase in the reaction zone with a partial pressure in the range of about $1.7 \times 10^{-15}$ to $2.3 \times 10^{-8}$ atmospheres; and an equilibrium sulfur concentration is provided in the gas phase with a partial pressure in the range of about $2.53 \times 10^{-7}$ to $8.1 \times 10^{-2}$ atmospheres. In the reaction zone, the free O/C atomic ratio is in the range of about 0.3 to 1.2, such as about 0.8 to 0.92, and the $H_2O$/liquid hydrocarbonaceous fuel and/or solid carbonaceous fuel weight ratio is in the range of about 0.1 to 5.0, such as about 0.15 to 2. A hot raw effluent gas stream leaves the reaction zone comprising $H_2$+CO and entrained molten slag. About 90 to 99.9 wt. % of the carbon in said fuel feedstock is converted into carbon oxides.

In the reaction zone of the partial oxidation gas generator, the copper and/or cobalt-containing material combines with at least a portion, such as substantially all or a large fraction e.g. about 40 to 100 wt. %, say about 70 to 90 wt. % of nickel, vanadium, silicon, and sulfur constituents found in the feedstock to produce molten slag comprising the following phases: (i) from about 0.1 to 10 wt. % of a Cu-Ni alloy phase and/or Co-Ni alloy phase, wherein the weight ratio of Cu and/or Co to Ni is in the range of about 0.2 to 0.9; (ii) from about 5 to 85 wt. % of a copper silicate and/or cobalt silicate phase in which the Cu and/or Co is present in the range of about 0.1 to 2.0 wt. %; (iii) from about 2.5 to 45 wt. % of a spinel phase in which the following are present in wt. %: V 5–60, Fe 7–65, Al 0.1–40, Mg 0.1–35, Cr 0.1–42, and others 0.1–10; and (iv) the remainder of the slag e.g. about 0 to 5 wt. % comprises a fluid oxysulfide phase comprising the sulfides of Cu and/or Co, and Fe; and wherein there is a reduction e.g. about 1 to 20 % in the mole ratio $H_2S + COS/H_2 + CO$ in the raw effluent gas stream over said mole ratio when said partial oxidation reaction takes place in the absence of said Cu and/or Co-containing materials. The formation of toxic $Ni_3S_2$ is thereby prevented. Advantageously, by the subject invention there is substantially no e.g. less than about 0.001 wt. % of nickel subsulfide in the slag. The sulfur potential in the gas, and the downstream gas cleaning costs may be reduced.

The composition of the hot, raw effluent gas stream directly leaving the reaction zone of the free-flow partial oxidation gas generator is about as follows, in mole percent: $H_2$ 10 to 70, CO 15 to 57, $CO_2$ 0.1 to 25, $H_2O$ 0.1 to 20, $CH_4$ nil to 60, $H_2S$ nil to 3, COS nil to 0.1 $N_2$ nil to 60, and Ar nil to 2.0. Particulate carbon is present in the range of about 0.2 to 20 weight % (basis carbon content in the feed). Ash is present in the range of about 0.5 to 5.0 wt. %, such as about 1.0 to 3.0 wt. % (basis total weight of fuel feed). Depending on the composition after removal of the entrained particulate carbon and ash by quench cooling and/or scrubbing with water or an oil scrubbing medium, and with or without dewatering, the gas stream may be employed as synthesis gas, reducing gas or fuel gas.

Another aspect of this invention is that the copper and/or cobalt-containing material may be selected on the basis of serendipitous catalytic properties in addition to its use in the generation of the washing and fluxing agent, as previously described. For example, it may act to produce more and/or a better quality of light products from the coker operation. It may also aid in the gasification reactions either by increasing the reaction rate and thus the throughput capacity of the gasifier or by increasing the conversion of the smooth and thus the overall efficiency of the process. Again, however, this invention does not depend on the catalytic properties of the copper and/or cobalt-containing material.

It was unexpectedly found that a preferred copper and/or cobalt-containing material for mixing with the sulfur-containing heavy liquid hydrocarbonaceous material having a nickel, vanadium, and silicon-containing ash or sulfur-containing solid carbonaceous fuel having a nickel, vanadium, and silicon-containing ash comprises compounds of copper and/or cobalt selected from the group consisting of oxides, sulfide, sulfate, carbonate, cyanide, chloride, nitrate, hydroxide, ferro or ferri cyanide, phosphate and mixtures thereof. In another embodiment the copper and/or cobalt-containing material is an organic compound selected from the group consisting of naphthenate, oxalate, acetate, citrate, benzoate, oleate, tartrate, butyrate, formate and mixtures thereof. The copper and/or cobalt-containing material may comprise about 30.0 to 100 wt. % of the compounds of copper and/or cobalt. The supplemental copper and/or cobalt-containing material may comprise any of the following: (1) inorganic or organic compounds of copper; (2) concentrated copper ore comprising at least 20 wt. % of copper; (3) concentrated copper ore comprising a mixture of the sulfides of copper, copper-iron, and iron with a small amount of gangue minerals; (4) copper sulfide and/or copper oxide minerals; (5) copper sulfide minerals selected from the groups consisting of bornite, chalcopyrite, tetrahedrite, tennentite, chalcocite, covellite, digenite and mixtures thereof; and (6) copper oxide minerals selected from the group consisting of cuprite, tenorite, malachite, azurite, brochantite, atacamite, chrysocolla and mixtures thereof.

In the preferred embodiment of the subject invention, a mixture comprising the aforesaid fuel feedstock comprising sulfur-containing heavy liquid hydrocarbonaceous fuel having a nickel, vanadium and silicon-containing ash and/or the sulfur-containing solid carbonaceous fuel having a nickel, vanadium, and silicon-containing ash, and the copper and/or cobalt-containing material are introduced into the partial oxidation gasifier. In another embodiment, the fuel feedstock to the subject process comprises a pumpable slurry of petroleum coke in water, liquid hydrocarbon fuel, or mixtures thereof.

In still another embodiment, the copper and/or cobalt containing material are mixed with the sulfur-containing heavy liquid hydrocarbonaceous material having a nickel, vanadium, and silicon-containing ash. The mixture is then fed into a conventional coking unit to produce petroleum coke. By this means, the finely ground copper and/or cobalt-containing material may be intimately mixed throughout the petroleum coke product. The comminuted copper and/or cobalt-containing material and the comminuted petroleum coke and mixtures thereof have a particle size so that 100% passes through a sieve of the size ASTM E-11 Standard Sieve Designation in the range of about 425 microns to 28 microns, or below. The ingredients of the aforesaid mixtures may be separately ground and then mixed together. Alternatively, the ingredients may be wet or dry ground together. Intimate mixing of the solid materials is thereby achieved, and the particle sizes of each of the solid materials in the mixture may be substantially the same. The dry ground mixture may be mixed with water or a liquid hydrocarbonaceous material or both to produce a pumpable slurry having a solids content in the range of about 50–65 wt. %. Alternatively, the solid materials may be wet ground with the liquid slurry medium. Alternatively, the mixture of particulate solids may be entrained in a gaseous medium and then introduced into the gas generator. The gas transport medium may be selected from the group consisting of steam, $CO_2$, $N_2$, free-oxygen containing gas, recycle synthesis gas, and mixtures thereof. In one embodiment of this process, the non-gaseous materials e.g. particulate carbon and slag may be separated from the hot effluent gas stream from the partial oxidation reaction zone by contacting the gas stream with water or an oil scrubbing medium. Advantageously, part of the sulfur in the feedstock e.g. about 1–20 wt. % may be converted into the oxysulfides of Cu and/or Co and Fe and leave the reaction zone in the slag.

In the embodiment wherein ground copper and/or cobalt-containing material is mixed with the sulfur-containing heavy liquid hydrocarbonaceous fuel having a nickel, vanadium, and silicon-containing ash and fed into a coker, the copper and/or cobalt-containing material may be introduced directly into the ash-containing petroleum liquid feed to the vacuum distillation tower, which normally precedes the coker unit. In either unit operation (coking or distillation), substantially all of the copper and/or cobalt-containing material should stay behind in the desired bottoms streams. In other words there should be little, if any, carry over of the copper and/or cobalt-containing material with the lighter products. A possible advantage for mixing the additive with the vacuum tower feed stream in preference to the bottoms stream (i.e. coker feed) is that the feed to the vacuum tower is significantly less viscous than the bottoms from the vacuum tower. A more thorough mixing may be thereby effected.

For example, a mixture comprising a high boiling liquid petroleum i.e. sulfur-containing heavy liquid hydrocarbonaceous fuel having a nickel, vanadium, and silicon-containing ash and the comminuted copper and/or cobalt-containing material, at a temperature in the range of about 650° F. is introduced into a delayed coking zone, for example by way of line 33, such as shown and described in coassigned U.S. Pat. No. 3,673,080, which is incorporated herein be reference. At a temperature in the range of about 800° F. to 895° F. and a pressure in the range of about 20 to 60 psig, uncondensed hydrocarbon effluent vapor and steam are removed overhead, and petroleum coke in admixture with copper and/or cobalt-containing material is removed from the bottom of said delayed coking zone.

In another embodiment, a mixture comprising a sulfur-containing high boiling liquid petroleum having a nickel, vanadium, and silicon-containing ash and the comminuted copper and/or cobalt-containing material, at a temperature in the range of about 550° F. to 750° F. is introduced into a fluidized bed coking zone for example by way of line 31, such as shown and described in U.S. Pat. No. 2,709,676, which is incorporated herein by reference. At a temperature in the range of about 1000° F. to 1200° F. and a pressure in the range of about 10 to 20 psig, uncondensed hydrocarbon effluent vapor and steam are removed overhead and said petroleum coke is removed from the bottom of said coking zone. The petroleum coke may be then ground to fuel size as previously described.

In other embodiments, this invention may be applied to other similar petroleum processes that produce a stream suitable for gasification. Any "bottom of the barrel" process that does not upgrade the bottoms or residue stream to extinction must ultimately produce such a stream. These streams, either liquid or normally solid but pumpable at elevated temperature, will produce the same gasification problems as discussed for coke. Thus, the invention of introducing copper and/or cobalt-containing material as part of the petroleum processing prior to gasification should, depending on the specific process, produce a feedstock that will be free of the gasification problems mentioned above. Most of these processes employ vacuum distillation as pretreatment. Accordingly, as described above, the copper and/or cobalt-containing material may be mixed with the vacuum distillation feed having a nickel, vanadium, and silicon ash. The additives will than emerge from the distillation column in the bottoms stream. In turn, the bottoms stream is the feed stream for the upgrading process. This incorporation of the copper and/or cobalt-containing material should not adversely affect these process, and the addition agents should ultimately emerge with the nickel, vanadium, and silicon-containing residue stream from each respective process. In all of the processes, this residue stream should be suitable for gasification by partial oxidation.

In another embodiment, the partial oxidation gas generator is operated continuously for about 1 to 180 days while, accumulating slag on the walls of the reaction zone. The reaction is stopped and the gas generator is opened thereby oxidizing the slag on the walls of said gasifier. The fusion temperature of the slag is reduced to about 2000° F. or below, and the viscosity is reduced. Molten slag containing substantially no $Ni_2S_3$ flows by gravity down the inside walls of the reaction zone. The hot molten slag may fall into quench water contained in a quench tank located in the bottom of the gas generator. See coassigned U.S. Pat. 3,544,291, which is incorporated herein by reference. Alternatively, the molten slag may pass through a central outlet located in the bottom of the slag gas generator. See coassigned U.S. Pat. 4,312,637, which is incorporated herein by reference.

A major benefit of the subject process is to produce a smaller volume of slag, with a higher vanadium content e.g. in excess of about 2.0 wt. % of V. Accordingly, the slag is more attractive for sale to a reclaimer.

Various modifications of the invention as herein before set forth may be made without departing from the spirit and scope thereof, and therefore, only such limitations should be made as are indicated in the appended claims.

I claim:

1. A process for the production of gaseous mixtures comprising $H_2+CO$ by the partial oxidation of a fuel feedstock comprising sulfur-containing heavy liquid hydrocarbonaceous fuel and/or solid carbonaceous fuel, and said fuels having nickel, vanadium and silicon-containing ashes, and said feedstock includes a minimum of about 0.5 ppm nickel, a minimum of about 0.2 wt. % of sulfur, a minimum of about 1.0 ppm of vanadium, and a minimum of about 5.0 ppm of silicon; said process comprising:

(1) mixing together a copper and/or cobalt-containing material with said fuel feedstock; wherein the weight ratio of copper and/or cobalt to nickel in said mixture is in the range of about 0.2 to 10; and the weight ratio of copper and/or cobalt to silicon in said mixture is in the range of about 0.0001 to 0.04;

(2) reacting said mixture from (1) by partial oxidation with a free-oxygen containing gas in a reducing atmosphere and in the presence of a temperature moderator at a pressure in the range of about 2 to 250 atmospheres in a down-flowing free-flow unobstructed vertical reaction zone with refractory lined walls of a partial oxidation gas generator and at a temperature in the range of about 1800° F. to 2900° F., and an equilibrium oxygen concentration is provided in the gas phase in the reaction zone with a partial pressure in the range of about $1.7 \times 10^{-15}$ to $2.3 \times 10^{-2}$ atmospheres; an equilibrium sulfur concentration is provided in the gas phase in the reaction zone with a partial pressure in the range of about $2.53 \times 10^{-7}$ to $8.1 \times 10^{-2}$ atmospheres, the free O/C atomic ratio is in the range of about 0.3 to 1.2 thereby producing a hot raw effluent gas stream comprising $H_2+CO$ and entrained slag; and converting about 90 to 99.9 wt. % of the carbon in said fuel feedstock into carbon oxides; and where in said reaction zone said copper and/or cobalt-containing material combines with at least a portion of said nickel, sulfur, and silicon constituents in the fuel feedstock to produce said slag with at least a portion depositing on the inside walls of said reaction zone and comprising the following phases in wt. %: (i) about 0.1 to 10 wt. % of a Cu-Ni alloy phase and/or Co-Ni alloy phase, wherein the weight ratio of Cu and/or Co to Ni is in the range of about 0.2 to 0.9; (ii) from about 5.0 to 85 wt. % of a copper silicate and/or cobalt silicate phase in which Cu and/or Co is present in the range of about 0.01 to 2.0 wt. %; (iii) from about 2.5 to 45 wt. % of a spinel phase in which the following are present in wt. %: V 5-60, Fe 7-65, Al 0.1-40, Mg 0.1-35, Cr 0.01-42, and others 0.1-10; and (iv) the remainder of the slag comprises a fluid oxysulfide phase comprising the sulfides of Cu and/or Co, and Fe; and wherein said slag contains substantially no $Ni_3S_2$ and there is a reduction in the mole ratio $H_2S + COS/H_2 + CO$ in the raw effluent gas stream over said mole ratio when said partial oxidation reaction takes place in the absence of said Cu and/or Co-containing materials, and (3) separating non-gaseous materials containing substantially no $Ni_3S_2$ from said hot raw effluent gas stream.

2. The process of claim 1 provided with the steps of stopping said partial oxidation reaction after about 1 to 180 days, changing the atmosphere in said reaction zone from reducing to oxidizing thereby oxidizing the slag on the walls of said reaction zone and thereby reducing its fusion temperature and viscosity, whereby molten slag containing substantially no $Ni_3S_2$ flows by gravity down the inside walls of the reaction zone.

3. The process of claim wherein said copper and/or cobalt-containing material comprises compounds of copper and/or cobalt selected from the group consisting of oxides, sulfide, sulfate, carbonate, cyanide, chloride, nitrate, hydroxide, ferro or ferri cyanide, phosphate and mixtures thereof.

4. The process of claim 1 wherein said copper and/or cobalt-containing material is an organic compound selected from the group consisting of naphthenate, oxalate, acetate, citrate, benzoate, oleate, tartrate, citrate, butyrate, formate and mixtures thereof.

5. The process of claim 1 wherein said copper and/or cobalt-containing material in (1) comprises and inorganic or organic compounds of copper.

6. The process of claim 1 wherein said copper and/or cobalt-containing material in (1) comprises concentrated copper ore comprising at least 20 weight % of copper.

7. The process of claim 6 wherein said concentrated copper ore is a mixture of the sulfides of copper, copper-iron and iron with a small amount of gangue minerals.

8. The process of claim 1 wherein said copper and/or cobalt-containing material comprises copper sulfide and/or copper oxide minerals.

9. The process of claim 1 wherein said copper and/or cobalt-containing material comprises copper sulfide minerals selected from the group consisting of bornite, chalcopyrite, tetrahedrite, tennentite, chalcocite, covellite, digenite and mixtures thereof.

10. The process of claim 1 wherein said copper and/or cobalt-containing material comprises copper oxide minerals selected from the group consisting of cuprite, tenorite, malachite, azurite, brochantite, atacamite, chrysocolla and mixtures thereof.

11. The process of claim 1 wherein said sulfur-containing heavy liquid hydrocarbonaceous fuel having a nickel, vanadium, and silicon-containing ash feedstock is selected from the group consisting of virgin crude, crude residue from petroleum distillation and cracking process operations, petroleum distillate, reduced crude, whole crude, asphalt, coal tar, coal derived oil, shale oil, tar sand oil and mixture thereof.

12. The process of claim 1 wherein said sulfur-containing heavy liquid hydrocarbonaceous fuel having a nickel, vanadium, and silicon-containing ash is a pumpable slurry of petroleum coke in water, liquid hydrocarbon fuel or mixtures thereof.

13. The process of claim 1 where in step (1) said copper and/or cobalt-material is introduced into the feed to or the bottoms from a vacuum distillation unit.

14. The process of claim 1 wherein said mixture of copper and/or cobalt-containing material and feedstock from step (1) has a particle size so that about 100% passes through a sieve of the size ASTM E-11 Standard Sieve Designation in the range of about 424 microns to 38 microns, or below.

15. The process of claim 1 wherein substantially all of the sulfur in said feedstock is converted into the fluid oxysulfide phase in (2)(iv) and leaves the reaction zone in the slag.

16. The process of claim wherein said fuel feedstock contains about 0.2 to 6.5 wt. % sulfur and about 5.0 to 20,000 ppm of silicon or more, and the molten slag produced in step (2) comprises about 0 to 5 wt. % of said fluid oxysulfide phase, and at least about 0.1 to 10 wt. % of said Cu-Ni alloy phase.

17. The process of claim 1 wherein the molten slag is produced in step (2) with a reduced viscosity in comparison with molten slag produced by the same partial oxidation process but without the addition of said copper and/or cobalt-containing material.

18. A process for the production of gaseous mixtures comprising $H_2 + CO$ by the partial oxidation of a fuel feedstock comprising sulfur-containing petroleum coke having an ash comprising nickel, vanadium and silicon; and said feedstock includes a minimum of about 0.5 ppm nickel, a minimum of about 0.2 wt. % of sulfur, a minimum of about 1.0 ppm of vanadium, and a minimum of about 5.0 ppm of silicon; said process comprising:

(1) mixing together a copper and/or cobalt-containing material with a sulfur-containing heavy liquid hydrocarbonaceous fuel having a nickel, vanadium and silicon containing ash; wherein the weight ratio of copper and/or cobalt to nickel in said mixture is in the range of about 0.2 to 10; and the weight ratio of copper and/or cobalt to silicon in said mixture is in the range of about 0.0001 to 0.04;

(2) coking said mixture from step (1) to produce sulfur-containing petroleum coke having a nickel, vanadium, and silicon-containing ash and having dispersed therein said copper and/or cobalt-containing material;

(3) introducing the petroleum coke from step (2) into a free-flow refractory lined partial oxidation reaction zone as a pumpable slurry of petroleum coke in water, liquid hydrocarbonaceous fluid or mixtures thereof, or as substantially dry petroleum coke entrained in a gaseous transport medium;

(4) reacting said slurry of petroleum coke from step (3) by partial oxidation with a free-oxygen containing gas in a reducing atmosphere and in the presence of a temperature moderator at a pressure in the range of about 2 to 250 atmospheres in a down-flowing free-flow unobstructed vertical reaction zone with refractory lined walls of a partial oxidation gas generator and at a temperature in the range of about 1800° F. to 2900° F., and an equilibrium oxygen concentration is provided in the gas phase in the reaction zone with a partial pressure in the range of about $1.7 \times 10^{-15}$ to $2.3 \times 10^{-8}$ atmospheres; an equilibrium sulfur concentration is provided in the gas phase in the reaction zone with a partial pressure in the range of about $2.53 \times 10^{-7}$ to $8.1 \times 10^{-2}$ atmospheres, the free O/C atomic ratio is in the range of about 0.3 to 1.2, the H$_2$O/liquid hydrocarbonaceous fuel and/or solid carbonaceous fuel weight ratio is in the range of about 0.1 to 5.0; thereby producing a hot raw effluent gas stream comprising H$_2$+CO and entrained slag; and converting about 90 to 99.9 wt. % of the carbon in said fuel feedstock into carbon oxides; and wherein said reaction zone said copper and/or cobalt-containing material combines with at least a portion of said nickel, sulfur, and silicon constituents in the fuel feedstock to produce said slag with at least a portion depositing on the inside walls of said reaction zone and comprising the following phases in wt. %: (i) about 0.1 to 10 wt. % of a Cu-Ni alloy phase and/or Co-Ni alloy phase, wherein the weight ratio of Cu and/or Co to Ni is in the range of about 0.2 to 0.9; (ii) from about 5.0 to 85 wt. % of a copper silicate and/or cobalt silicate phase in which Cu and/or Co is present in the range of about 0.01 to 2.0 wt. %; (iii) from about 2.5 to 45 wt. % of a spinel phase in which the following are present in wt. %: V 5-60, Fe 7-65, Al 0.1-40, Mg 0.1-35, Cr 0.01-42, and others 0.1-10; and (iv) the remainder of the slag comprises a fluid oxysulfide phase comprising the sulfides of Cu and/or Co, and Fe; and wherein said slag contains substantially no Ni$_3$S$_2$ and there is a reduction in the mole ratio H$_2$S +COS/H$_2$+CO in the raw effluent gas stream over said mole ratio when said partial oxidation reaction takes place in the absence of said Cu and/or Co-containing materials; and (5) separating non-gaseous materials containing substantially no Ni$_3$S$_2$ from said hot raw effluent gas stream.

19. The process of claim 18 wherein said copper and/or cobalt-containing material comprises copper and/or copper compounds selected from the group consisting of oxides, sulfide, sulfate, carbonate, cyanide, chloride, nitrate and mixtures thereof.

20. The process of claim 18 wherein said mixture of copper and/or cobalt-containing material and feedstock from step (1) has a particle size so that 100% passes through a sieve of the size ASTM E-11 Standard Designation in the range of about 425 microns to 38 microns or below.

21. The process of claim 18 wherein said copper and/or cobalt-containing material includes an inorganic or organic compound of copper and/or cobalt.

22. The process of claim 18 wherein said sulfur-containing heavy liquid hydrocarbonaceous fuel having a nickel, vanadium, and silicon-containing ash is a high boiling liquid petroleum feed to or the bottoms from a vacuum tower or a fractionator.

23. The process of claim 18 where in step (2) the mixture from step (1) at a temperature in the range of about 650° F. to 930° F. is introduced into a delayed coking zone where at a temperature in the range of about 800° F. to 895° F. and a pressure in the range of about 20 to 60 psig, uncondensed hydrocarbon effluent vapor and steam are removed overhead and said sulfur-containing petroleum coke having a nickel, vanadium, and silicon-containing ash and having uniformly dispersed therein said copper and/or cobalt-containing material is removed from the bottom.

24. The process of claim 18 where in step (2) the mixture from step (1) at a temperature in the range of about 550° F. to 750° F. is introduced into a fluidized bed coking zone where at a temperature in the range of about 1000° F. to 1200° F. and a pressure in the range of about 10 to 20 psig, uncondensed hydrocarbon effluent vapor and steam are removed overhead and said petroleum coke is removed from the bottom.

25. The process of claim 18 where in step (5) said nongaseous materials are separated from said hot effluent gas stream by contacting the gas stream from step (4) with a water or an oil scrubbing medium.

* * * * *

UNITED STATES PATENT AND TRADEMARK OFFICE
CERTIFICATE OF CORRECTION

PATENT NO. : 4,851,152

DATED : July 25, 1989

INVENTOR(S) : Mitri S. Najjar

It is certified that error appears in the above-identified patent and that said Letters Patent is hereby corrected as shown below:

Column 10, line 47 – Change "$10^{-2}$" to --$10^{-8}$--

Signed and Sealed this

Twenty-seventh Day of November, 1990

Attest:

HARRY F. MANBECK, JR.

*Attesting Officer*  *Commissioner of Patents and Trademarks*